United States Patent
Son et al.

(10) Patent No.: US 8,139,670 B1
(45) Date of Patent: Mar. 20, 2012

(54) MODULAR MIMO TRANSCEIVER ARCHITECTURE

(75) Inventors: Sang Won Son, Sunnyvale, CA (US); Paolo Rossi, Pavia (IT); Siu Chuang Lu, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 736 days.

(21) Appl. No.: 12/235,333

(22) Filed: Sep. 22, 2008

Related U.S. Application Data (60) Provisional application No. 60/974,296, filed on Sep. 21, 2007.

(51) Int. Cl.
 *H04B 7/02* (2006.01)
(52) U.S. Cl. ........ 375/267; 375/260; 375/299; 375/340; 375/347; 455/101; 455/132; 455/296; 455/500; 455/562.1; 370/334

(58) Field of Classification Search .................. 375/260, 375/267, 299, 340, 347; 455/101, 132, 296, 455/500, 562.1; 370/334
See application file for complete search history.

(56) References Cited

U.S. PATENT DOCUMENTS

| 7,212,798 | B1 * | 5/2007 | Adams et a | ................. | 455/251.1 |
| 2007/0173286 | A1 * | 7/2007 | Carter et al. | ............... | 455/553.1 |

* cited by examiner

*Primary Examiner* — Leon Flores

(57) ABSTRACT

A scalable N×N single-chip dual-band MIMO RF transceiver module compatible with the IEEE 802.11n standard for WLAN applications is provided. A modular design approach allows a transceiver of substantially any dimension to be created on a single chip that may be easily integrated with other system components. An N×N MIMO transceiver module includes N substantially identical transceiver blocks and a common local oscillator. Each transceiver block includes transmitters and receivers for transmitting and receiving signals in two distinct frequency bands. The transceiver blocks further include one or more local oscillator signal repeaters for receiving one or more local oscillator signals and forwarding the one or more local oscillator signals to subsequent transceiver blocks.

24 Claims, 5 Drawing Sheets

MODULAR MIMO TRANSCEIVER ARCHITECTURE

CROSS-REFERENCE TO RELATED APPLICATION

This application is based on and claims priority to U.S. Provisional Patent Application Ser. No. 60/974,296, entitled "A Fully-Integrated Dual-Band 3T×3R MIMO Transceiver in 90 nm CMOS" which was filed on Sep. 21, 2007, the entire disclosure of which is incorporated herein by reference.

FIELD OF TECHNOLOGY

The present disclosure relates to a modular single-chip dual-band MIMO transceiver. The modular design approach disclosed herein provides a scalable (N×N) dual-band MIMO transceiver suitable for IEEE 802.11n WLAN applications.

BACKGROUND

The demand for high speed wireless networking is rapidly increasing. High speed wireless networks are desired for both enterprise and consumer applications. As high speed wireless networks evolve and become more ubiquitous, there is a constant demand for higher throughput and longer range. IEEE 802.11n is a wireless networking standard that addresses these needs. IEEE 802.11n employs multiple-input multiple-output (MIMO) transceiver technology to improve performance. MIMO transceivers allow multiple independent spatial data streams to be transmitted or received simultaneously over the same spectral channel of bandwidth. Within a MIMO transceiver each data stream requires a discrete antenna and its own RF processing chain. In order to achieve low costs, low power consumption and a small form factor, an integrated multi-transceiver approach is desired. A unique feature of IEEE 802.11n is that it allows great flexibility in the number and configuration of the spatial data streams in order to meet various system requirements.

Typical MIMO transceivers include a local oscillator for generating a local oscillator signal which is distributed to transceiver blocks located elsewhere on an integrated circuit chip. In order to reduce the form factor of the MIMO transceiver chip, the transceiver blocks are typically arranged adjacent to or as near as possible to the local oscillator. For example, a 2T×2R MIMO transceiver may include a pair of transceiver blocks symmetrically placed on either side of the local oscillator so that the local oscillator signal may be conveniently provided to both transceiver blocks. MIMO transceivers with a greater number of spatial channels, such as 3T×3R or 4T×4R MIMO transceivers, may have transceiver blocks arranged in a more circular or semi-circular pattern around the local oscillator in order to receive the local oscillator signal directly from the local oscillator.

A problem with the existing design approach is that it is not easily scalable. Significant design changes are required to the chip floor plan if it is desired to add an additional spatial channel or otherwise alter the configuration or capacity of the MIMO transceiver. Additionally, the irregular placement of the transceiver blocks in current MIMO transceiver designs make path matching for the separate spatial channels difficult. What is more, each additional transceiver block requires at least 4 additional pins for interfacing the transmit (Tx) and receive (Rx) signals between the transceiver chip and the baseband circuitry of the WLAN system in which the MIMO transceiver is installed. The additional pins for larger MIMO transceivers further complicate the design requirements of a single chip MIMO transceiver.

A new scalable design approach toward single chip MIMO transceivers is desired. Such a new design approach should allow MIMO transceivers of substantially any size to be produced without significant redesign requirements. Such a design approach should also provide adequate path matching between Tx and Rx signal path and provide adequate separation between Tx ports of the same frequency. An improved MIMO transceiver should also reduce the number of pins required to interface the transceiver with the WLAN baseband circuitry.

SUMMARY OF THE DISCLOSURE

The present disclosure relates to a scalable single-chip N×N dual-band MIMO RF transceiver module. The transceiver includes a frequency synthesizer for generating a local oscillator signal used to modulate baseband signals that are to be transmitted by the transceiver and demodulate RF signals received by the transceiver. The transceiver further includes a plurality of transceiver bocks. Each transceiver block is adapted to independently transmit and receive wireless signals. The transceiver blocks are arranged in a line or row adjacent the frequency synthesizer. A first transceiver block immediately adjacent the frequency synthesizer receives the local oscillator signal directly from the frequency synthesizer. The first transceiver block uses the local oscillator signal to modulate and demodulate signals that are transmitted and received by the first transceiver block. The first transceiver block includes a local oscillator signal repeater. The local oscillator signal repeater receives the local oscillator signal, amplifies it and provides it to the next adjacent transceiver block. This process is repeated until the local oscillator signal has been distributed to each transceiver block in the MIMO RF transceiver.

Thus, an embodiment of a modular MIMO RF transceiver comprises a frequency synthesizer generating a local oscillator signal, and a plurality of transceiver blocks. One or more of the transceiver blocks includes a local oscillator signal repeater. The plurality of transceiver blocks are arranged sequentially from the frequency synthesizer. A local oscillator signal repeater associated with a first transceiver block nearest the frequency synthesizer receives the local oscillator signal from the frequency synthesizer, amplifies the local oscillator signal and outputs the repeated local oscillator signal to a next transceiver block. The modular MIMO RF transceiver may comprise, for example, 3×3 MIMO RF transceiver.

Another embodiment provides a transceiver for use in a modular MIMO RF transceiver system. In this embodiment the transceiver includes a local oscillator signal repeater that receives a local oscillator signal, amplifies the local oscillator signal and outputs the local oscillator signal. A transmitter within the transceiver transmits a received baseband signal at an RF frequency derived from the local oscillator signal. Similarly, a receiver within the transceiver receives an RF signal and down converts the signal to a baseband signal by mixing the received signal with the local oscillator signal. The transceiver module may be adapted to operate in dual frequency bands, based on first and second local oscillator signals.

Yet another embodiment provides a single chip dual band MIMO transceiver. The dual band transceiver includes a frequency synthesizer that generates first and second local oscillator signals. A first transceiver block adjacent the frequency synthesizer receives the first and second local oscillator signals. The first transceiver block is adapted to transmit a first Tx signal in a first frequency band corresponding to the first local oscillator signal and a second Tx signal in a second frequency band corresponding to the second local oscillator signal. The first transceiver block is further adapted to receive a first Rx signal in the first frequency band and a second Rx signal in the second frequency band. The first transceiver block includes a first signal repeater and a second signal repeater. The first signal repeater is adapted to receive the first local oscillator signal from the frequency synthesizer and output the first local oscillator signal to a second adjacent transceiver block. The second signal repeater is adapted to receive the second local oscillator signal from the frequency synthesizer and output the second local oscillator signal to the adjacent transceiver block. The second transceiver block receives the first and second local oscillator signals from the first transceiver block. The second transceiver block is adapted to transmit a third transmit signal in the first frequency band and a fourth transmit signal in the second frequency band. The second transceiver block is further adapted to receive a third received signal in the first frequency band and a fourth received signal in the second frequency band.

Still another embodiment provides a scalable MIMO transceiver system. The scalable MIMO transceiver system includes a frequency synthesizer generating a local oscillator signal and a plurality of transceiver blocks arranged in a row adjacent the frequency synthesizer. A plurality of local oscillator signal repeaters are associated with the plurality of transceiver blocks. The local oscillator signal is provided to a first transceiver block in the plurality of transceiver blocks for modulating baseband signals to be transmitted by the first transceiver block with a carrier signal having a frequency based on the local oscillator signal, and demodulating signals received by the first transceiver block in a frequency band determined by the local oscillator signal. A first local oscillator signal repeater associated with the first transceiver block receives the local oscillator signal from the frequency synthesizer and forwards the local oscillator signal to a second transceiver block in the plurality of transceiver blocks. The second transceiver block similarly modulates baseband signals to be transmitted by the second transceiver block with a carrier signal having a frequency based on the local oscillator signal, and demodulates signals received by the second transceiver block in a frequency band determined by the local oscillator signal.

Finally, a method of providing a modular MIMO transceiver is disclosed. The method includes providing a frequency synthesizer for generating a local oscillator signal and providing a plurality of transceiver blocks that include local oscillator signal repeaters. The method next calls for sequentially arranging the plurality of transceiver blocks in a row adjacent the frequency synthesizer. When the transceiver blocks are so arranged, the method calls for providing the local oscillator signal from the frequency synthesizer to a first transceiver block immediately adjacent the frequency synthesizer and repeating the local oscillator signal using the local oscillator signal repeater included with the first transceiver block. The method then calls for providing the repeated local oscillator signal to a second transceiver block immediately adjacent the first transceiver block.

DETAILED DESCRIPTION

The present disclosure relates to a scalable N×N single-chip dual-band MIMO RF transceiver module compatible with the IEEE 802.11n standard for WLAN applications. A modular design approach allows a transceiver of substantially any dimension to be created on a single chip that may be easily integrated with other system components. An embodiment of such a transceiver described herein comprises a 3×3 MIMO RF transceiver supporting three spatial streams and capable of delivering PHY rates up to 450 Mb/s. The 3×3 MIMO transceiver module includes three substantially identical transceiver blocks and a common local oscillator. Each transceiver block includes transmitters and receivers for transmitting and receiving signals in two distinct frequency bands. The transceiver blocks further include local oscillator signal repeaters for receiving the local oscillator signals and forwarding them to subsequent transceiver blocks.

Figure 1:
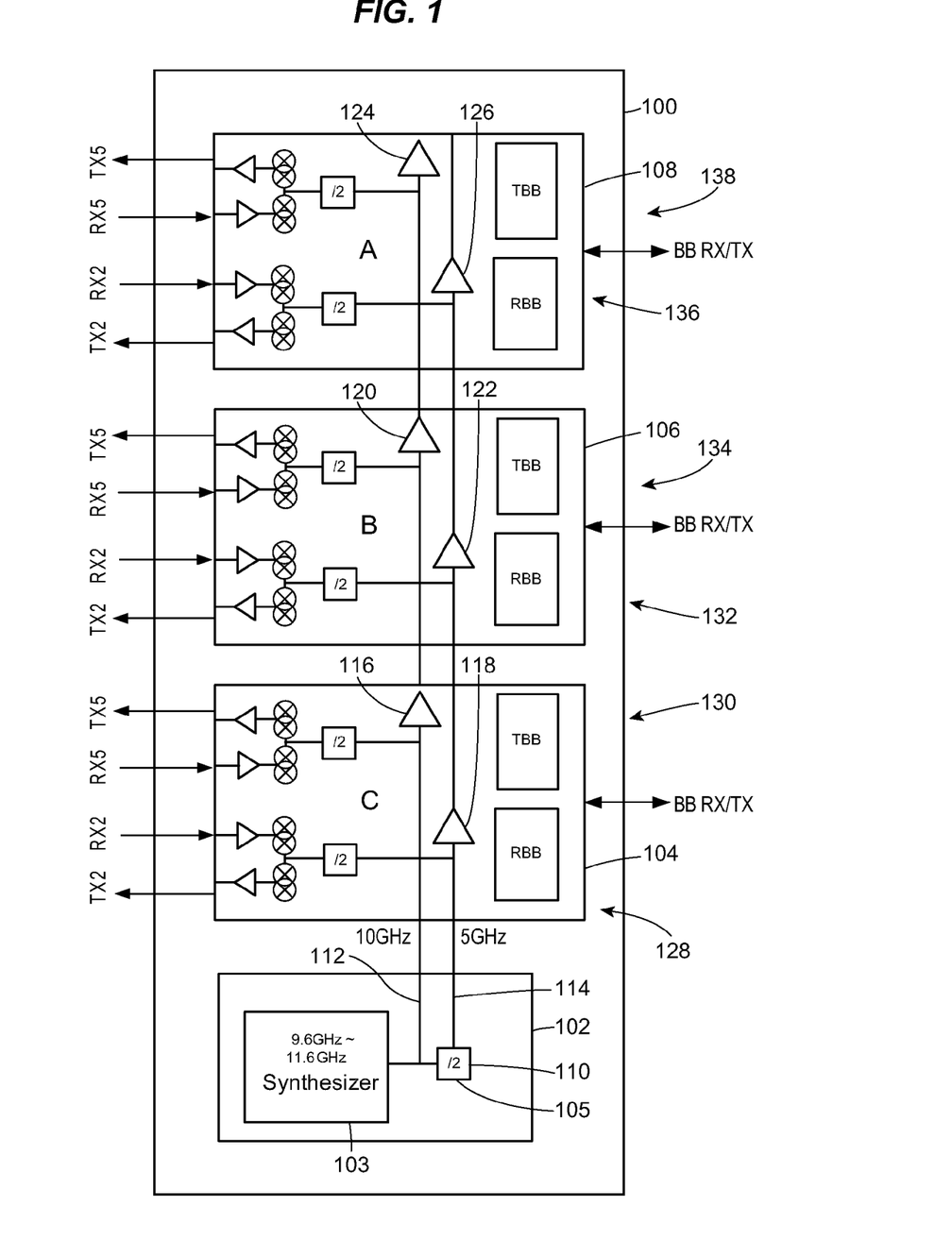
FIG. 1 is a block diagram of a modular 3×3 MIMO RF transceiver.

FIG. 1 is a block diagram of a modular 3×3 MIMO RF transceiver 100. The 3×3 MIMO RF transceiver 100 comprises a local oscillator 102 and three substantially identical transceiver blocks 104, 106, 108. The frequency synthesizer 102 and the three transceiver blocks 104, 106, 108 are arranged on a single integrated circuit chip in the manner shown, with the local oscillator 102 located along a bottom edge of the chip and the transceiver blocks 104, 106, 108, cascaded in ascending order above the local oscillator 102. (The modular MIMO transceiver module 100 is scalable in that a transceiver module of substantially any size may be provided by producing integrated circuit chips having more or fewer identical transceiver blocks arranged in a similar manner.)

The transceiver 100 is a dual band transceiver. Each transceiver block 104, 106, 108 is adapted to transmit and receive RF signals in two distinct frequency bands. According to an embodiment, the transceivers 104, 106, 108 are adapted to transmit and receive RF signals in a first frequency band from 4.915 GHz to 5.825 GHz and a second frequency band from 2.412 GHz to 2.484 GHz. For convenience these two frequency bands will simply be referred to as a 5 GHz band and a 2.5 GHz band. For optimal performance the local oscillator 102 generates a pair of phase-synchronized local oscillator signals 112, 114 that are provided to the transceiver blocks 104, 106, 108 for modulating and demodulating the transmit (Tx) and receive (Rx) signals. The local oscillator signals 112, 114 are distributed to the transceiver modules at approximately twice the corresponding channel frequency. Accordingly, the local oscillator 102 generates local oscillator signals 112, 114 of approximately 5 GHz and 10 GHz.

The local oscillator 102 comprises a frequency synthesizer 103 that generates a 10 GHz local oscillator signal 112. The 10 GHz signal is actually in the frequency range from approximately 9.6 GHz-11.64 GHz. For convenience the first local oscillator signal 112 is referred to as the 10 GHz signal, though one will realize that this is a nominal value which may fall anywhere in the 9.6 GHz-11.6 GHz frequency band. To cover the required frequency range, the frequency synthesizer 103 employs a pair of voltage controlled oscillators (VCOs). These are followed by a dual-input single-output VCO buffer to generate the 10 GHz local oscillator signal 112. The local oscillator 102 includes a divide-by-two frequency divider 105 which divides the frequency of the 10 GHz local oscillator signal 112 approximately in half to obtain the second 5 GHz local oscillator signal 114. Again, the frequency of this second local oscillator signal will fall within a range of frequencies, in this case, 4.8 GHz-5.8 GHz, however, for convenience it is simple referred to as a 5 GHz local oscillator signal. The most straightforward technique for frequency division employs source coupled logic (SCL) dividers. Due to large capacitive loading, however, this solution is not well suited for the present application. To satisfy the power consumption requirements, and provide an efficient MIMO RF transceiver, an injection locking frequency divider (ILFD) may be is adopted.

In the embodiment shown in FIG. 1, a divide by 2 ILFD 110 divides the 10 GHz local oscillator signal 112 to generate the 5 GHz local oscillator signal 114. Providing two local oscillator signals 112, 114 increases the potential frequency range of the MIMO transceiver. Typically only one local oscillator signal will be active at a time, depending on the operating mode of the MIMO transceiver. As shown in FIG. 1, the first and second local oscillator signals 112, 114 are input to the first transceiver block 104. The first transceiver block 104 uses the local oscillator signals 112, 114 to modulate signals that are to be transmitted by the first transceiver block 104 and to demodulate signals that are received by the first transceiver block 104. In addition to transmitter and receiver portions, the first transceiver block 104 includes first and second local oscillator signal repeaters 116, 118. The first and second local oscillator signal repeaters 116, 118 receive the first and second local oscillator signals 112, 114 from the frequency synthesizer and amplify them prior to forwarding them on to the second transceiver block 106. Current-mode local oscillator repeaters may be employed in each transceiver block 104, 106, 108 to achieve the maximum possible bandwidth. In a current-mode local oscillator repeater, the local oscillator signal received from the frequency synthesizer 102 or from the previous transceiver block is passed through a common-gate amplifier to convert the signal back to voltage mode locally, where the current mode signal is amplified and passed on to the next transceiver block. The repeater amplitude is calibrated to ensure the same performance for each transceiver.

Like the first transceiver block 104, the second transceiver block 106 also uses the first and second local oscillator signals 112, 114 to modulate and demodulate signals that are to be transmitted by and which are received by the second transceiver block 106. The second transceiver block 106 similarly includes first and second local oscillator signal repeaters 120, 122. The first and second local oscillator signal repeaters 120, 122 receive the first and second local oscillator signals 112, 114 from the first transceiver block 104, amplify them, and forward them to the third transceiver block 108.

Again, like the first and second transceiver blocks 104, 106, the third transceiver block 108 uses the first and second local oscillator signals 112, 114 to modulate and demodulate signals that are to be transmitted by and which are received by the third transceiver block 108. The third transceiver block 108, however, may or may not include first and second local oscillator signal repeaters 124, 126. In this case, where the transceiver 100 comprises a 3×3 MIMO RF transceiver, there is no need for the local oscillator signal repeaters in the third transceiver block 108, since the first and second local oscillator signals need not be forwarded to a fourth transceiver block. For the sake of uniformity and improved scalability, however, the third transceiver block 108 may include first and second local oscillator signal repeaters 124, 126 as shown in FIG. 1, even when they may not actually used. In this case, the 3×3 MIMO transceiver 100 of FIG. 1 could be readily expanded to a 4×4 MIMO RF transceiver by simply adding an additional transceiver block to the chip without modifying the third transceiver block in any way.

The layout of the MIMO RF transceiver 100 has a number of advantages. The linear arrangement of the transceiver modules 104, 106, 108 provides significant physical separation between the Tx Ports of each transceiver block so that separate Tx signals of the same frequency but output by the different transceiver blocks do not interfere with one another. The linear arrangement of the transceiver modules also improves the path matching characteristics of the MIMO RF transceiver 100. What is more, the modular design approach is easily scalable in that MIMO RF transceivers of different sizes may be developed and manufactured without significant redesign requirements.

Figure 2:
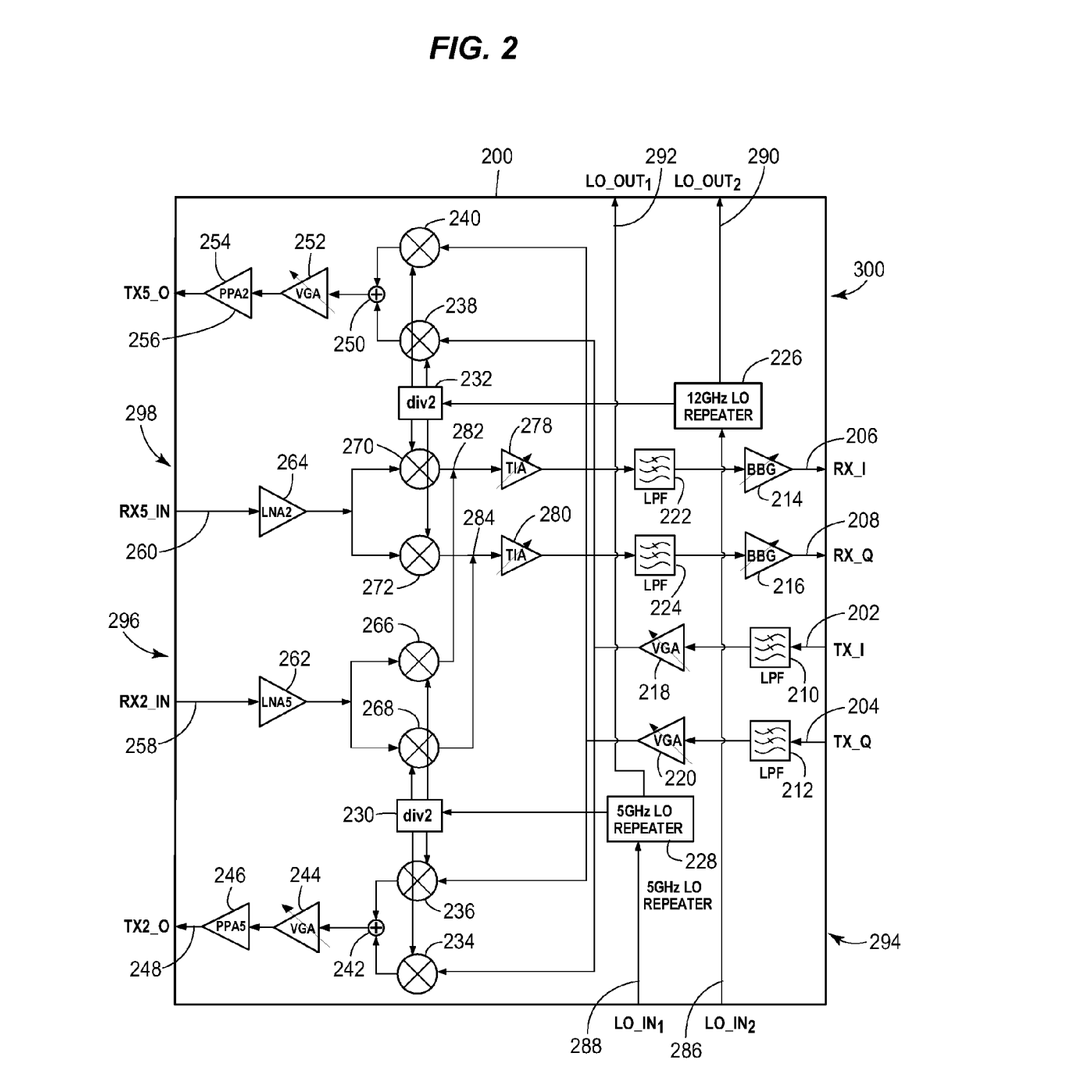
FIG. 2. is a block diagram of a transceiver block for use in a modular transceiver such as that shown in FIG. 1.

A detailed block diagram of a transceiver block 200 is shown in FIG. 2. The transceiver block 200 may be one of the transceiver blocks 104, 106, 108 in the 3×3 MIMO transceiver 100 of FIG. 1, or the transceiver may be part of some other sized or differently arranged transceiver. The transceiver block 200 includes first and second transmitter portions 294, 300, and first and second receiver portions 296, 298. Both the transmitter portions 294, 300 and the receiver portions 296, 298 employ a direct-conversion architecture with local oscillator signals operating at twice the carrier frequency. A first local oscillator signal repeater 226 receives a first local oscillator signal input 286 and provides a first local oscillator signal output 290. A second local oscillator signal repeater 228 receives a second local oscillator signal 288 and provides a second local oscillator signal output 292. The transceiver 200 further includes a first divide-by-two frequency divider 230, and a second divide-by-two frequency divider 232. The transceiver architecture requires the divide-by-two circuits for generating appropriate carrier signals for up-converting baseband transmit signals to the RF operating frequency bands of the dual band transceiver, and down-converting received RF signals to baseband. The divide-by-two circuits may comprise modified versions of a conventional CML static frequency divider in order to achieve higher operating frequencies.

The first divide-by-two frequency divider 230 divides the frequency of the first local oscillator signal 286 in half to provide a first carrier signal having a frequency equal to one-half the first local oscillator signal frequency. The second divide-by-two frequency divider 232 divides the frequency of the second local oscillator signal 288 in half to provide a second carrier signal having a frequency equal to one-half the second local oscillator signal frequency. As mentioned above, the frequency of the first local oscillator signal is approximately 10 GHz and the frequency of the second local oscillator signal is approximately 5 GHz. Therefore, in the embodiment shown in FIG. 2, the frequency of the first carrier signal output from the first divide-by-two frequency divider will be approximately 5 GHz and the frequency of the second carrier signal output from the second divide-by-two frequency divider will be approximately 2.5 GHz.

The transceiver module 200 receives baseband I/Q signals Tx_I 202 and Tx_Q 204. The signal path for the Tx_I signal 202 includes a third order low-pass filter 210 and a variable gain amplifier 218. The signal path for the Tx_Q signal 204 similarly includes a third order low-pass filter 212 and a variable gain amplifier 220. The first transmitter portion 294 of the transceiver block 200 includes a first signal mixer 234 and a second signal mixer 236. The first signal mixer 234 up-converts the Tx_I baseband signal 202, and the second mixer 236 up-converts the Tx_Q baseband signal 204 to the frequency band corresponding to the first carrier signal output from the first divide-by-two frequency divider 320. A summing junction 242 combines the output from the two mixers 234, 236 and provides the combined signal to a variable gain amplifier (VGA) 244 and a pre-power amplifier (PPA) 246. The output of the pre-power amplifier 246 comprises a 2.5 GHz transmit signal Tx2_O 248.

The second transmitter portion 300 of the transceiver block 200 includes a third signal mixer 238 and a fourth signal mixer 240. The third signal mixer 238 up-converts the Tx_I baseband signal 202 and the fourth mixer 240 up-converts the Tx_Q baseband signal 204 to the frequency band corresponding to the second carrier signal output from the second divide-by-two frequency divider 232. Again, a summing junction 250 combines the output of the two mixers 238, 234 and provides the combined signal to a variable gain amplifier (VGA) 252 and a pre-power amplifier (PPA) 254. The output of the pre-power amplifier 254 comprises a 5 GHz transmit signal Tx5_O 256.

The RF VGAs 244, 252 and PPAs 244, 254 amplify the signals and provide coarse gain adjustments. The transmitters have a gain range of 36 dB in steps of 0.5 dB. In order to achieve high linearity and reduce sensitivity to the bias, the derivative superposition (DS) method may be implemented in the RF amplifier stages. The DS method uses two parallel FETs of different widths and gate biases (one biased at class-C mode, the other at class-A mode) to achieve a composite dc transfer characteristic with an extended input range in which the 3rd-order derivative of the combined current is close to zero. Since the DS method is based on small-signal derivations and not optimized for current consumption, it is best used in places where signal strength is relatively small and current consumption is not a major concern, in other words, in the RF VGA and PPA stages. The PPA output stage 246 is still designed as a traditional class-AB amplifier.

The first and second receiver portions 296, 298 of the transceiver block 200 comprise direct conversion receivers. The first receiver portion 296 receives a first receive signal Rx2_IN 258. Rx2_IN has a frequency in the 2.5 GHZ frequency band. The first received signal Rx2_IN 258 is input to a first low-noise amplifier (LNA) 262. Differential LNAs are typically used in many receiver designs, especially in the direct-conversion architecture, to minimize various undesirable effects such as DC offsets. Single-ended LNAs, however, may be chosen to reduce power consumption, reduce the form factor of the transceiver integrated circuit, and reduce the number of RF ports required for each transceiver. Single-ended LNA architecture consists of an inductively degenerated common source stage. The supply voltage of the LNA is heavily regulated to reduce supply noise coupling to the LNA stage 262.

Figure 5:
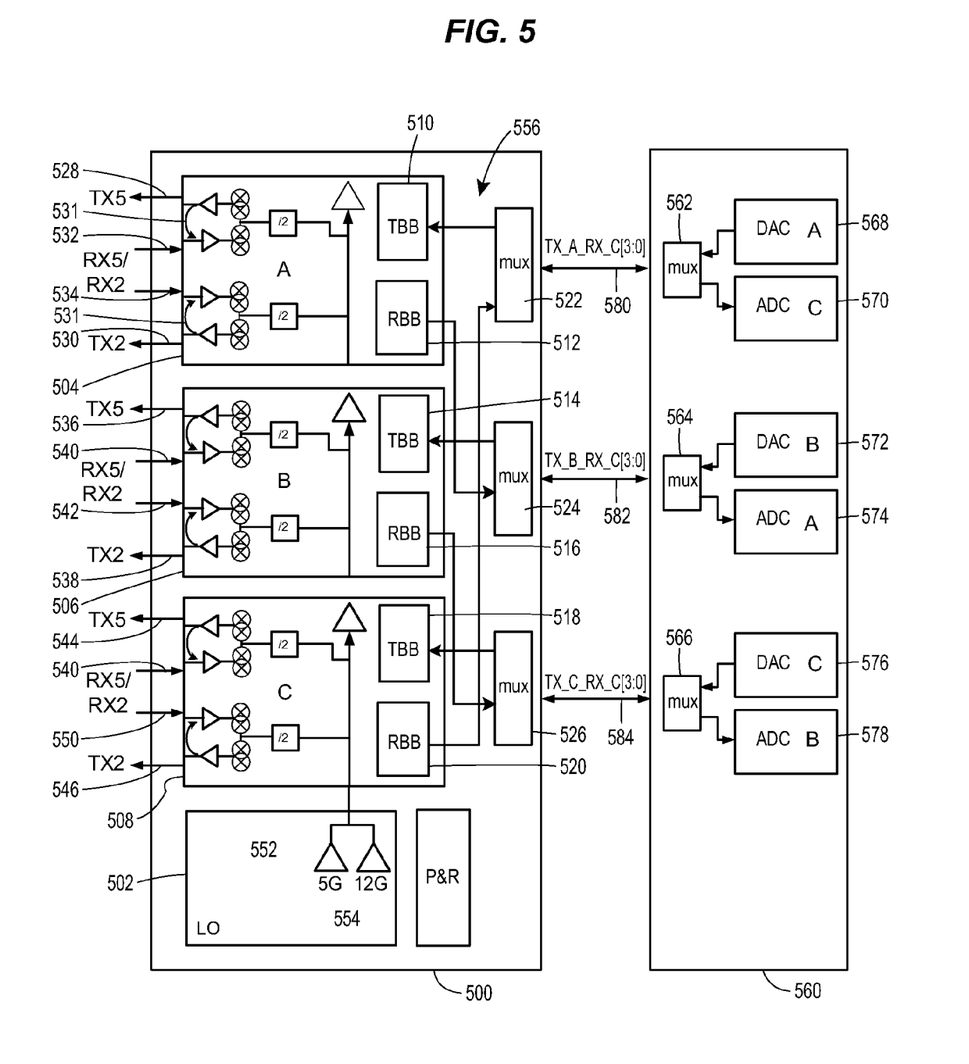
FIG. 5. is a block diagram of a 3×3 MIMO RF transceiver and corresponding WLAN baseband circuitry in which both Tx and Rx signals share common sets of signal interface pins.

After being amplified in the LNA stage 262, the first received signal is split and provided to fifth and sixth I/Q signal mixers 266, 268. The fifth and sixth I/Q mixers 266, 268 down-convert the received RF signal to the desired baseband, in order to extract the I/Q baseband components of the first receive signal Rx2_IN 258. The down-conversion mixer may comprise a double balanced Gilbert Cell based mixer 500 as shown in FIG. 5. At the mixer input stage, the PMOS device 502 is used as a current-reuse transconductor. The same transistor 502 is also used to achieve a balance between low flicker noise and third order input intercept preferred setpoint (IIP3) performance in the switching core. Common mode degeneration resistors 504 are utilized for both the NMOS and PMOS gain matching branches to improve second order input intercept preferred setpoint (IIP2) and I/Q gain matching.

The second receiver portion 298 of the transceiver block 200 is substantially similar to the first receiver portion 296. The second receiver portion 298 receives a second signal Rx5_IN 260. Rx5_IN 260 has a frequency in the 5 GHZ band. The second received signal Rx5_IN 260 is input to a second low-noise amplifier (LNA) 264. The second receive signal Rx5_IN is then split and provided to seventh and eighth signal mixers 270, 272. The seventh and eight mixers 270, 272 down-convert the received RF signal to the baseband frequency in order to extract the I/Q baseband components of the second receive signal Rx5_IN 260. Again, the down-conversion mixers 270, 272 may each comprise double balanced Gilbert Cell based mixers 500 as shown in FIG. 5.

Returning to FIG. 2, the output of the fifth signal mixer 266 (the Rx_I component of the first received signal) is connected to the output of the seventh signal mixer 270 at circuit node 282. Thus, the output from either the fifth signal mixer 266 or the seventh signal mixer 270 is then input to a first transimpedance amplifier 278. Similarly, the output of the sixth signal mixer 268 (the Rx_Q component of the first received signal) is connected to the output of the eighth signal mixer 272 at a circuit node 284. Thus, the output from either the sixth signal mixer 268 or the eighth signal mixer 272 is input to a second transimpedance amplifier 29-. The transimpedance amplifiers improve mixer linearity by reducing the signal swing at the drain of the mixers' switching cores.

The Rx_I signal is filtered by a low-pass filter 222, amplified by a baseband variable gain amplifier 214, and output as the received signal Rx_I 206. Similarly, the Rx_Q signal is filtered by a low-pass filter 224, amplified by a baseband variable gain amplifier 216 and output as the received signal Rx_Q 208. The low pass filters 222, 224 reject blocking signals, and the baseband VGAs 214, 216 fine-tune the gain to the optimal level before digitization. The received error vector magnitude signal (EVM) strongly depends on the signal-to-noise ratio (SNR) and the distortion of the receiver. Signal detectors may be located at various positions in the receiver chain to ensure that the various components are operating within their linearity limits. The gain switching point of the LNAs and LPFs is optimized so that EVM is minimized for a wide input power range.

Figure 3:
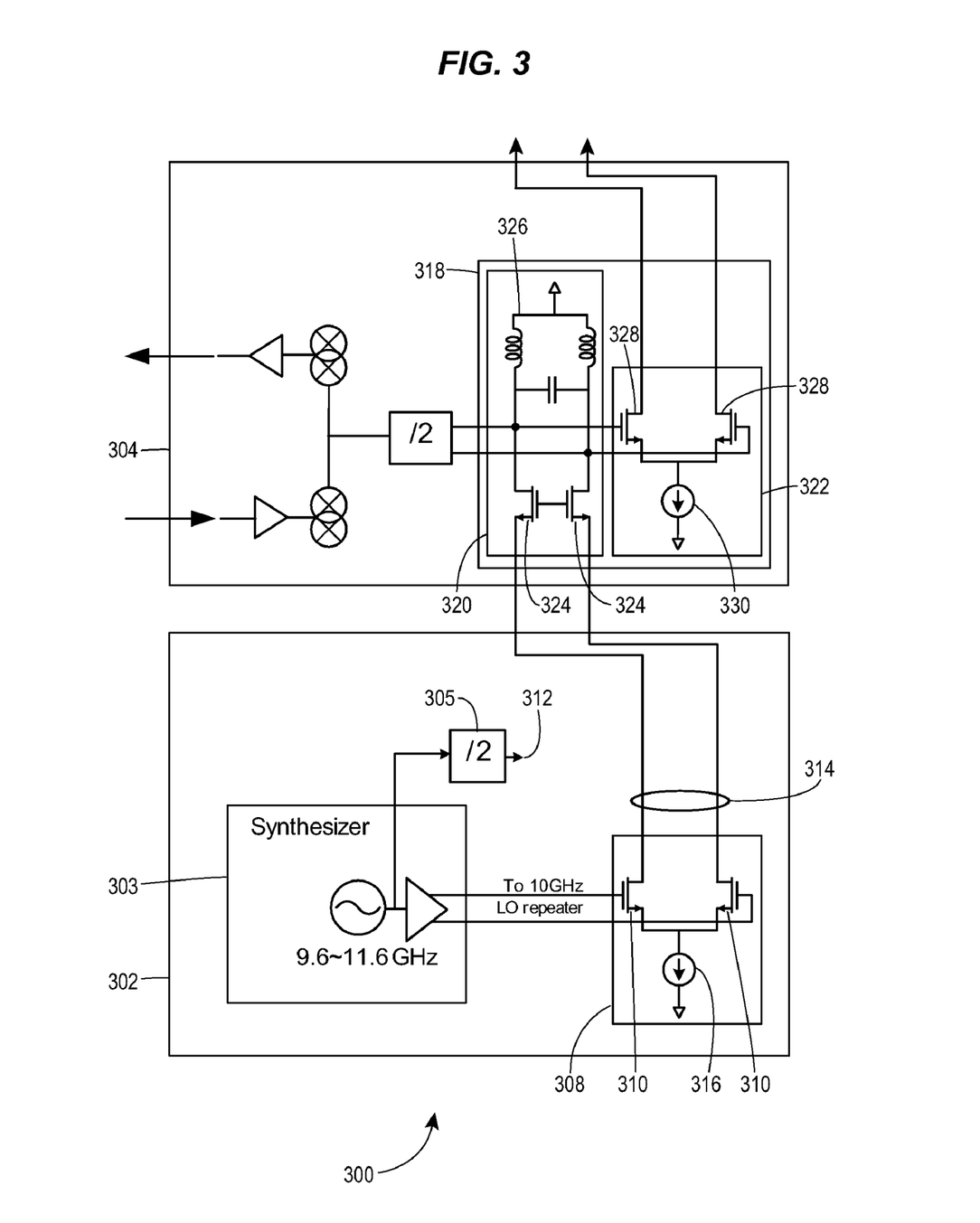
FIG. 3 is a circuit diagram showing circuitry for providing a local oscillator signal and a local oscillator signal repeater.
Figure 4:
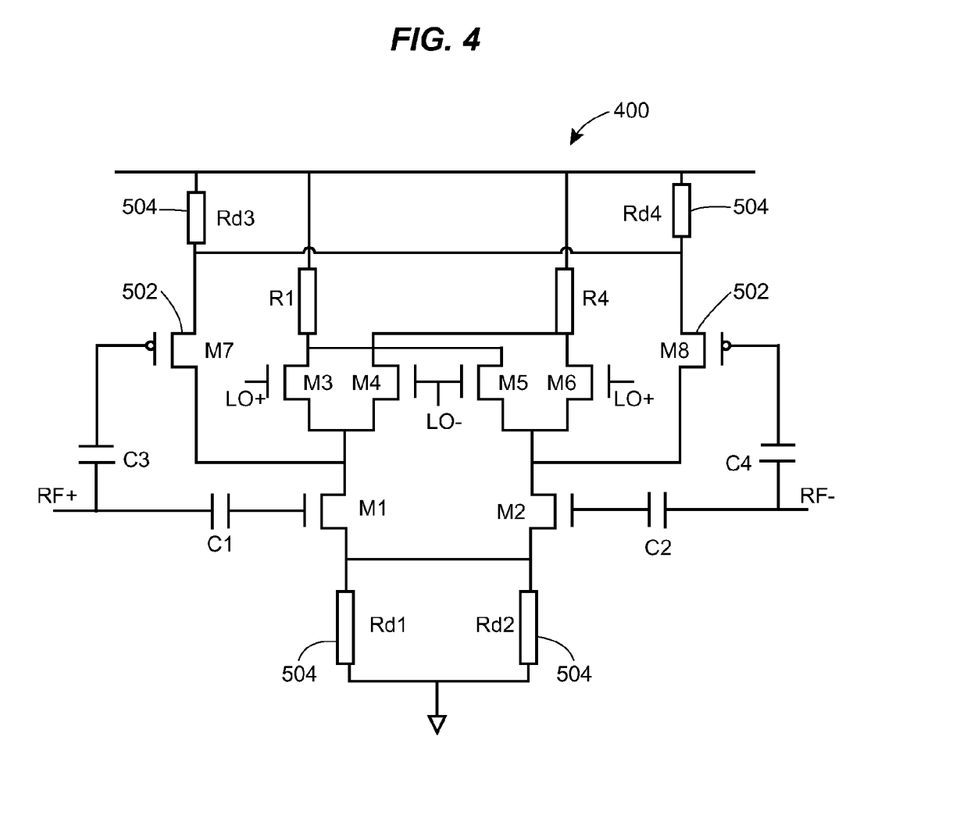
FIG. 4 is a circuit diagram of a double balanced Gilbert Cell signal mixer.

As mentioned above, the local oscillator signal repeaters in the transceiver blocks 104, 106, 108 may comprise current mode repeaters to maximize potential bandwidth. An example of a current mode local oscillator signal repeater is shown in FIG. 3. FIG. 3 shows a modular MIMO transceiver 300 that includes a local oscillator 302 and a transceiver block 304. The modular transceiver 300 may include any number of additional transceiver blocks 304, but for purposes of illustrating a current mode local oscillator signal reater just one transceiver block is shown, with the understanding that the current mode local oscillator signal repeaters in other transceiver blocks will be substantially identical to that shown in the transceiver block 304 in FIG. 3.

The local oscillator 302 includes a frequency synthesizer 303 that generates the first 10 GHz local oscillator signal 312. The local oscillator 302 further includes a divide by 2 frequency divider 305 for generating the second, 5 GHz, local oscillator signal 314. A voltage-to-current mode transconductance stage 308 is shown for converting the 10 GHz local oscillator signal from a voltage signal to a current signal. Although not shown in FIG. 3, a similar transconductance stage is provided for the 5 GHz signal 314 output from the divide by 2 frequency divider 305. The voltage-to-current mode transconductance stage 308 comprises a pair of MOSFET transistors 310 and a current source 312. The drains of the two MOSFET devices 310 are connected in a common drain arrangement with the drains of both MOSFET devices connected to the input of the current source 312. The 10 GHz voltage signal output from the frequency synthesizer is applied to the gates of the two MOSFET devices, the source terminals of the two MOSFET devices 310 provide the 10 GHz current mode local oscillator signal 314 that is provided to the first transceiver block 304.

The 10 GHz local oscillator signal repeater 318 in the first transceiver block 304 includes a common gate amplifier circuit 320, a voltage-to-current mode transconductance stage 322. The common gate amplifier 320 comprises a pair of MOSFET transistors 324 connected in a common gate arrangement, and a tuned LC loading circuit 326, connected to the source terminals of the two MOSFET devices 324. The 10 GHz current mode local oscillator signal 314 is connected to the drains of the two MOSFET devices 324. The two MOSFET devices 324 and the LC loading circuit 326 convert the 10 GHz current mode local oscillator signal back into a voltage signal. The converted voltage signal is then provided to a frequency divider 327, and is used for upconverting and downconverting signals transmitted and received by the transceiver block 104. The converted voltage signal is also provided to the voltage-to-current transconductance stage 322 in the same manner that the 10 GHz local oscillator signal generated by the frequency synthesizer 303 was provided to the voltage-to-current transconductance stage 308 of the local oscillator 302. The voltage-to-current transconductance stage 322 of the local oscillator signal repeater 318 is substantially identical to the voltage-to-current mode transconductance stage 308 of the local oscillator 308, including a pair of MOSFET transistors 328 connected in a common drain arrangement with a current source 330. The source terminals of the two MOSFET devices 328 provide the 10 GHz current mode local oscillator signal 312 to the next transceiver block in the modular MIMO transceiver.

The MIMO RF transceiver 200 may be capable of transmit and receive I/Q calibration. A baseband single tone may be applied to an input of the transmitter. The resulting RF spectrum of the up-converted tones consists of the main RF tone and the sideband tone from I/Q mismatch. This signal is loop-backed to the receiver and down-converted to baseband using a low IF receiver. The received signal may then be analyzed for I/Q compensation in the digital domain.

In addition to the reduced form factor, scalability, and improved path matching of the MIMO RF transceiver module disclosed herein, the transceiver layout may also be employed to reduce the number of pins required for interfacing the RF transceiver integrated circuit chip with the baseband circuitry of a WLAN-system. A typical RF transceiver block such as transceiver blocks 104, 106, 108 in FIG. 1 requires a total of four pins for receiving a baseband I/Q transmit signal from the WLAN baseband circuitry. These include Tx_I+ and Tx_I− pins for receiving the Tx_I component of the transmit signal, and Tx_Q+ and Tx_Q− pins for receiving the Tx_Q component of the transmit signal. Similarly, a typical RF transceiver block requires four pins for interfacing baseband I/Q signals received by the receiver portion of the transceiver with the baseband circuitry of the WLAN system. These include Rx_I+ and Rx_I− pins for interfacing the Rx_I component of the received signal to the baseband circuitry, and Rx_Q+ and Rx_Q− pins for providing the Rx_Q component of the received signal to the baseband circuitry. Thus, 8 pins total are required for interfacing signals between a single RF transceiver block and the baseband portion of the WLAN circuitry. In the 3×3 transceiver module 100 of FIG. 1 this adds up to a total of 24 pins for interfacing Tx and Rx signals between the transceiver module 100 and the baseband circuitry.

The transceiver blocks 104, 106, 108 cannot transmit and receive signals simultaneously. Therefore, the number of interface pins could be reduced by half by sharing the same set of pins for interfacing both Tx and Rx signals. A multiplexer or other switching mechanism associated with the transceiver may be employed to connect the interface pins to the transmitter portion of the transceiver during a transmitting mode of operation, and to the receiver portion of the transceiver during a receiving mode. Thus, in the transmitting mode, baseband signals from the WLAN circuitry may be applied to the four interface pins associated with the transceiver block as described and transmitted by the transmitting portion of the transceiver. Similarly, in the receiving mode, the multiplexer or other switching mechanism may connect down-converted baseband signals received by the receiver portion of the transceiver block to the same set of interface pins to convey the received signals from the transceiver block to the WLAN baseband circuitry. By sharing pins in this manner, the total number of interface pins in a 3×3 transceiver module may be reduced from 24 to 12.

In order to perform an I/Q calibration loop back test, however, a transceiver block must be able to receive Tx signals from the baseband circuitry, and provide Rx signals to the baseband circuitry simultaneously. In conducting such a test, a single tone signal is generated in the baseband circuitry and is applied to the input of the transmitter. The transmitter up-converts the signal to RF frequency and loopback circuitry couples the transmitted signal back to the receiver. The transceiver down converts the received test signal and provides the baseband signal to the WLAN baseband circuitry, which analyzes the received test signal to determine the amount of I/Q compensation required for satisfactory operation of the communication channel. Unfortunately, performing such a loop-back test precludes sharing interface pins between the transmit and receive portions of the transceiver, since the retransmitted signal received by the first transceiver would have to be output to the WLAN baseband circuitry on the same set of pins dedicated to receiving the outbound test signal from the WLAN baseband circuitry.

This obstacle to sharing interface pins, however, may be surmounted by splitting up and reordering the corresponding transmit and receive functions associated with the plurality of communication sub-channels established by the plurality of transceiver blocks of a multi-channel MIMO RF transceiver module. Such an arrangement is illustrated in FIG. 5. A 3×3 modular MIMO RF transceiver 500 similar to the transceiver module 100 shown in FIG. 1 is provided. The transceiver module 500 includes a frequency synthesizer 502 and three substantially similar transceiver blocks, Transceiver block A 504, Transceiver block B 506, and Transceiver block C 508. Again, the frequency synthesizer provides a pair of local oscillator signals 552, 554 to the transceiver blocks 504, 506, 508 for modulating and demodulating signals transmitted and received by the transceiver blocks 504, 506, 508. The transceiver blocks 504, 506, 508 comprise dual band transceivers capable of transmitting and receiving signals in two distinct frequency bands. Transceiver block A 504 transmits a first set of 5 GHz and 2.5 GHz Tx signals 528, 530 and receives a first set of 5 GHz and 2.5 GHz Rx signals 532, 534. Transceiver block B 506 transmits a second set of 5 GHz and 2.5 GHz Tx signals 536, 538 and receives a second set of 5 GHz and 2.5 GHz Rx signals 540, 542. Finally, Transceiver block C transmits a third set of 5 GHz and 2.5 GHz Tx signals 544, 546, and receives a third set of 5 GHz and 2.5 GHz Rx signals 548, 550.

For simplicity, the low-pass filters, amplifiers, and other components associated with receiving baseband signals from the WLAN baseband circuitry 560 and for outputting received baseband signals to the WLAN baseband circuitry 560 have been consolidated and are shown simply as transmit baseband blocks (TBB) and receive baseband blocks (RBB). Thus, transceiver block A 504 includes TBB block 510 and RBB block 512. Transceiver block B 506 includes TBB block 514 and RBB block 516. Transceiver block C 508 includes TBB block 518 and RBB block 520. The 3×3 MIMO RF transceiver module 500 further includes three multiplexers 522, 524, 526. The multiplexers 522, 524, 526 switch between transmit and receive modes of operation. In the transmit mode the multiplexers 522, 524, 526 connect Tx signals received from the WLAN baseband circuitry 560 to the TBB blocks 512, 514, 518 associated with the various transceiver blocks 504, 506, 508. In the receive mode, the multiplexers 522, 524, 526 connect down-converted baseband Rx signals from the RBB blocks 512, 516, 520 to the baseband circuitry 560. An internal bus structure 556 on the MIMO RF transceiver 500 integrated circuit chip routes signals between the various TBB blocks 510, 514, 518 and RBB blocks 512, 516, 520 and the multiplexers 522, 524, 526.

The 3×3 MIMO RF transceiver 500 supports three separate communication sub-channels, each associated with one of the transceiver blocks 504, 506, 508. These may be identified as communication sub-channels A, B and C. Each communication sub-channel supports both Tx and Rx signals. Thus, communication sub-channel A supports transmit signals Tx_A which originate in the WLAN baseband circuitry 560 and are provided to the MIMO RF transceiver 500 for transmission to one or more external devices. Communication sub-channel A further supports received signals Rx_A which are received by the MIMO RF transceiver 500 from one or more external devices and provided to the WLAN baseband circuitry 560. Similarly, communication sub-channel B supports transmit signals Tx_B and receive signals Rx_B. Communication sub-channel C supports transmit signals Tx_C and receive signals Rx_C. The WLAN baseband circuitry 560 includes a digital-to-analog converter DAC A 568 for converting digital signals into the analog baseband Tx_A signals for transmission over communication sub-channel A. The WLAN baseband circuitry 560 further includes digital-to-analog converter DAC B 572 for converting digital signals into analog baseband Tx_B signals for transmission over communication sub-channel B. Finally, the WLAN baseband circuitry 560 includes digital-to-analog converter DAC C 576 for converting digital signals into analog baseband Tx_C signals for transmission over communication sub-channel C. Conversely, the WLAN baseband circuitry 560 further includes analog-to-digital converter ADC A 574 for converting analog baseband Rx_A signals received over communication sub-channel A into digital signals, analog-to-digital converter ADC B 578 for converting analog baseband Rx_B signals received over communication sub-channel B into digital signals, and analog-to-digital converter ADC C 576 for converting analog baseband signals Rx_C received over communication sub-channel C into digital signals. The WLAN baseband circuitry 560 further includes first, second and third multiplexers 562, 564, 566. As with the multiplexers 522, 524, 526 in the MIMO RF transceiver module 500, the multiplexers 562, 564, 566 associated with the WLAN baseband circuitry 560 switch between transmit and receive modes of operation. In the transmit mode, the multiplexers 562, 564, 566 connect Tx signals from the digital-to-analog converters 568, 572, 576 to the transceiver module 500. In the receive mode the multiplexers 562, 564, 566 connect baseband Rx signals received by the transceiver to the analog-to-digital converters 570, 574, 578.

The WLAN baseband circuitry 560 interfaces with the MIMO RF transceiver 500 via three distinct signal paths 580, 582, 584. Each signal path 580, 582, 584 comprises four conductors (corresponding to pins on the transceiver integrated circuit chip package) connecting the WLAN baseband multiplexers 562, 564, 566 to the MIMO RF transceiver multiplexers 522, 524, 526. With four conductors, each signal path 580, 584, 586 is capable of carrying one of either a baseband I/Q Tx signal (Tx_I+, Tx_I−, Tx_Q+, Tx_Q−) from the WLAN baseband circuitry 560 to the MIMO RF transceiver 500, or a baseband I/Q Rx signal (Rx_I+, Rx_I−, Rx_Q+, Rx_Q−) from the MIMO RF transceiver 500 to the WLAN baseband circuitry 560. Since the transmit and receive signals share the signal paths 580, 582, 584, only 12 conductors are required to interface the MIMO RF transceiver 500 with the WLAN baseband circuitry 560.

The problem of performing the I/Q calibration loop-back test while sharing the interface connections between both Tx and Rx signals is avoided by routing corresponding Tx and Rx signals from the same transceiver block 504, 506, 508 to separate multiplexers 522, 524, 526 of the MIMO RF transceiver 500, so that an outgoing Tx test signal and the corresponding incoming Rx test signal travel across separate signal paths between the MIMO RF transceiver 500 and the WLAN baseband circuitry 560.

As can be seen in FIG. 5, the internal bus structure 556 of the MIMO RF transceiver module 500 routes outgoing Tx_A signals from the first multiplexer 522 to the TBB block 510 in transceiver block A 504, while incoming Rx_A signals are routed from the RBB block 512 in transceiver block A 504 to the second transceiver multiplexer 524. The first multiplexer 522 is connected to the first communication path 580 between the WLAN baseband circuitry 560 and the transceiver module 500, and the second multiplexer 524 is connected to the second signal path 582 between the WLAN baseband circuitry 560 and the transceiver module 500. Thus, Tx_A signals cross the interface between the WLAN baseband circuitry 560 and the transceiver module 500 over the first signal path 580, while Rx_A signals cross the interface over the second signal path 582. Similarly, outgoing Tx_B signals are routed from the second transceiver multiplexer 524 to the TBB block 514 in transceiver block B 504, while incoming Rx_B signals are routed from the RBB block 516 in transceiver block B 504 to the third transceiver multiplexer 526. As mentioned, the second transceiver multiplexer 524 is connected to the second signal path 584 between the transceiver module 500 and the WLAN baseband circuitry 560. The third multiplexer 526 is connected to the third signal path 584. Thus, Tx_B signals cross the interface between the WLAN baseband circuitry 560 and the transceiver module 500 over the second signal path 582, while Rx_B signals cross the interface over the third signal path 584. Finally, outgoing Tx_C signals are routed from the third transceiver multiplexer 526 to the TBB block 518 of transceiver C 504, while inbound Rx_C signals are routed from the RBB block 520 of transceiver C to the first transceiver multiplexer 522. Thus, Tx_C signals cross the interface between the WLAN baseband circuitry 560 and the transceiver module 500 over the third signal path 584, while Rx_C signals cross the interface over the first signal path 580.

On the WLAN baseband side of the interface, the first WLAN baseband multiplexer 562 is connected to the first signal path 580 between WLAN baseband circuitry and the transceiver module 500. The first WLAN baseband multiplexer 562 switches between connecting Tx_A signals from DAC A 568 to the first signal path 580, and connecting Rx_B signals from the first signal path 580 to ADC C 570. The second WLAN baseband multiplexer 564 is connected to the second signal path 582 and switches between connecting Tx_B signals from DAC B 572 to the second signal path 582, and connecting Rx_A signals from the second signal path 582 to ADC A 574. Finally, the third WLAN baseband multiplexer 566 is connected to the third signal path 584 and switches between connecting Tx_C signals from DAC C 576 to the first signal path, and connecting Rx_B signals from the third signal path 584 to ADC B 578.

During an I/Q calibration loop back test for communication sub-channel A, the first transceiver multiplexer 522 and the first WLAN baseband multiplexer 562 operate in the transmit mode. The second transceiver multiplexer 524 and the second WLAN baseband multiplexer 564 operate in the receive mode. A test signal $Tx\_A_{test}$ originates in the WLAN baseband circuitry 560. The test signal $Tx\_A_{test}$ is converted to an analog baseband signal by DAC A 568 and provided to the first WLAN baseband multiplexer 562. The WLAN baseband multiplexer 562 connects the $Tx\_A_{test}$ signal to the first signal path 580, and the first transceiver multiplexer 522 connects the first signal path 580 to TBB block 510 of transceiver block A 504. Thus, the baseband signal $Tx\_A_{test}$ is conveyed from DAC A 508 in the WLAN baseband circuitry 560 to TBB block 510 in transceiver A 504 via the first signal path 580. Transceiver block A 504 transmits the test signal and loopback circuitry 531 couples the transmitted test signal to the receiver portion of transceiver A 504. Transceiver block A 504 receives the looped back test signal as received signal $Rx\_A_{test}$ and outputs the received test signal via the RBB block 512. The $Rx\_A_{test}$ signal is routed from the RBB block 512 to the second transceiver multiplexer 524. The second transceiver multiplexer 524 connects the received $Rx\_A_{test}$ signal to the second signal path 582, and the second WLAN baseband multiplexer 564 connects the second signal path 582 to ADC A 574. Thus, the baseband signal $Rx\_A_{test}$ is conveyed from the RBB block 512 in transceiver block A to ADC A 574 in the WLAN baseband circuitry 560 via the second signal path 582. The ADC A 574 digitizes the received $Rx\_A_{test}$ signal, and the WLAN baseband circuitry 560 determines the level of I/Q compensation required for communication subchannel A in the digital domain. By routing the received $Rx\_A_{test}$ signal back to the WLAN baseband circuitry 560 over a separate signal path, the conflict between the $Tx\_A_{test}$ signal and the $Rx\_A_{test}$ signal during the loop-back test is resolved.

As described above, the transmit and receive signals associated with the other transceiver blocks 504, 506 are similarly routed to separate multiplexers and thus conveyed across the interface between the transceiver module 500 and the WLAN baseband circuitry 560 by separate interface signal paths. Tx_B signals are routed over the second signal path 582, while Rx_B signals are routed over the third signal path 584. Tx_C signals are routed over the third signal path 584, while Rx_C signals are routed over the first signal path 580. By staggering the performance of the I/Q calibration loop-back tests for each transceiver block 504, 506, 508, the interface pins for each transceiver block may be shared between Tx and Rx signals without interference. Thus, the total number of interface pins for coupling signals between the transceiver module 500 and the WLAN baseband circuitry may be reduced by half.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The invention claimed is:

1. A modular MIMO RF transceiver comprising:
a local oscillator generating a local oscillator signal;
a plurality of transceiver blocks including at least a first transceiver block, a second transceiver block, and a third transceiver block, wherein one or more of the plurality of transceiver blocks includes a local oscillator signal repeater, and wherein the plurality of transceiver blocks are arranged sequentially from a frequency synthesizer;
a local oscillator signal repeater associated with a transceiver block nearest the frequency synthesizer, wherein the local oscillator signal repeater is configured to i) receive the local oscillator signal as an input from the local oscillator and ii) output a repeated local oscillator signal to a next transceiver block;
a plurality of sets of signal interface pins, including at least a first set of signal interface pins, a second set of signal interface pins, and a third set of signal interface pins;
a first multiplexer that switches between i) connecting transmit signals from the first set of signal interface pins to the first transceiver block and ii) connecting receive signals from the second transceiver block to the first set of signal interface pins;
a second multiplexer that switches between i) connecting transmit signals from the second set of signal interface pins to the second transceiver block and ii) connecting receive signals from the third transceiver block to the second set of signal interface pins; and
a third multiplexer that switches between i) connecting transmit signals from the third set of signal interface pins to the third transceiver block and ii) connecting receive signals from the first transceiver block to the third set of signal interface pins.

2. The modular MIMO RF transceiver of claim 1, wherein the local oscillator generates i) a first local oscillator signal at a first frequency and ii) a second local oscillator signal at a second frequency, and wherein each one of the plurality of transceiver blocks comprises a dual band transceiver block to transmit and to receive RF signals in first and second frequency bands derived from the first and second local oscillator signals.

3. The modular MIMO RF transceiver of claim 1, wherein each one of the plurality of transceiver blocks comprises a dual band transceiver transmitting and receiving RF signals in two distinct frequency bands.

4. The modular MIMO RF transceiver of claim 3, wherein the two distinct frequency bands comprise a 2.5 GHz band and a 5 GHz band.

5. The modular MIMO RF transceiver of claim 3, wherein the local oscillator generates two local oscillator signals each corresponding to one of the distinct frequency bands, and wherein at least one of the plurality of transceiver blocks includes first and second local oscillator signal repeaters to forward the two local oscillator signals to a next one of the plurality of transceiver blocks.

6. The modular MIMO RF transceiver of claim 1, wherein at least one of the plurality of transceiver blocks comprises:
a first transmitter to transmit an input baseband signal in a first frequency band, and a second transmitter to transmit the input baseband signal in a second frequency band;

a first receiver to receive RF signals transmitted in the first frequency band, and a second receiver to receive RF signals transmitted in a second frequency band;

a first local oscillator repeater to receive a first local oscillator signal having a first local oscillator signal frequency, and to output a repeated first local oscillator signal to the next transceiver block; and a second local oscillator repeater to receive a second local oscillator signal having a second local oscillator signal frequency, and to output a repeated second local oscillator signal to the next transceiver block.

7. The modular MIMO RF transceiver of claim 6 wherein the at least one transceiver block further comprises:

a first frequency divider to divide the frequency of the first local oscillator signal to provide a first carrier signal having a frequency equal to approximately one half the frequency of first local oscillator signal, and a second frequency divider to divide the frequency of the second local oscillator to provide a second carrier signal having a frequency equal to approximately one half the frequency of the second local oscillator signal;

a first signal mixer and a second signal mixer associated with the first transmitter, the first signal mixer to mix the first carrier signal with a TX_I baseband signal, and the second signal mixer to mix the first carrier signal with a TX_Q baseband signal;

a first summing junction associated with the first transmitter, wherein the first summing junction is configured to add i) a first mixed signal output from the first signal mixer and ii) a second mixed signal output from the second signal mixer to create a first transmit signal in the first frequency band;

a third signal mixer and a fourth signal mixer associated with the second transmitter, the third signal mixer to mix the second carrier signal with the TX_I baseband signal, and the fourth signal mixer to mix the second carrier signal with the TX_Q baseband signal;

a second summing junction associated with the second transmitter, wherein the second summing junction is configured to add i) a third mixed signal output from the third signal mixer and ii) a fourth mixed signal output from the fourth signal mixer to create a second transmit signal in the second frequency band;

a first received signal input associated with the first receiver, the first received signal input to receive signals transmitted in the first frequency band;

a second received signal input associated with the second receiver, the second received signal input to receive signals transmitted in the second frequency range;

a fifth signal mixer and a sixth signal mixer associated with the first receiver, wherein the fifth signal mixer and the sixth signal mixer are configured to mix the first received signal with the first carrier signal to respectively down convert the first received signal into separate I and Q components; and a seventh signal mixer and an eighth signal mixer associated with the second receiver, wherein the seventh signal mixer and the eighth signal mixer are configured to mix the second received signal with the second carrier signal to respectively down convert the first received signal into separate I and Q components.

8. A transceiver module for use in a modular MIMO RF transceiver system, the transceiver module comprising:

at least a first transceiver and a second transceiver, each of the first transceiver and the second transceiver comprising:

a local oscillator signal repeater configured to receive a local oscillator signal, amplify the local oscillator signal, and output the local oscillator signal;

a transmitter configured to transmit a baseband signal at an RF frequency derived from the local oscillator signal; and a receiver configured to receive an RF signal and down convert the signal to a baseband signal by mixing the received signal with the local oscillator signal; and at least a first multiplexer and a second multiplexer, wherein the first multiplexer switches between i) connecting transmit signals from a first set of baseband signal interface pins to the transmitter of the first transceiver and ii) connecting receive signals from the receiver of the second transceiver to the first set of baseband signal interface pins, and the second multiplexer switches between i) connecting transmit signals from a second set of baseband signal interface pins to the transmitter of the second transceiver and ii) connecting receive signals from the receiver of the third transceiver to the second set of baseband signal interface pins.

9. The transceiver module of claim 8, wherein each of the plurality of transceivers is i) adapted to operate in dual frequency bands, and ii) adapted to receive a first local oscillator signal and a second local oscillator signal, wherein the transmitter of each of the plurality of transceivers is adapted to transmit baseband signals in a first frequency band and a second frequency band based on the first local oscillator signal and the second local oscillator signal, and wherein the receiver of each of the plurality of transceivers is adapted to i) receive signals in the first frequency band and the second frequency band and ii) down convert the received signals to baseband signals using the first local oscillator signal and the second local oscillator signal.

10. The transceiver module of claim 9, wherein each of the plurality of transceivers further comprises a first local oscillator signal repeater configured to repeat the first local oscillator signal and a second local oscillator signal repeater configured to repeat the second local oscillator signal.

11. A single chip dual band MIMO transceiver comprising:

a frequency synthesizer generating a first local oscillator signal and a second local oscillator signal;

a first transceiver block adjacent the frequency synthesizer, the first transceiver block adapted to transmit i) a first transmit signal in a first frequency band corresponding to the first local oscillator signal and ii) a second transmit signal in a second frequency band corresponding to the second local oscillator signal, the first transceiver block further adapted to receive i) a first received signal in the first frequency band and ii) a second received signal in the second frequency band;

a second transceiver block adjacent the first transceiver block, the second transceiver block adapted to transmit i) a third transmit signal in the first frequency band and ii) a fourth transmit signal in the second frequency band, the second transceiver block further adapted to receive i) a third received signal in the first frequency band and ii) a fourth received signal in the second frequency band;

the first transceiver block including a first signal repeater and a second signal repeater, the first signal repeater adapted to i) receive the first local oscillator signal from the frequency synthesizer and ii) output the first local oscillator signal to the second transceiver block, and the second signal repeater adapted to i) receive the second local oscillator signal from the frequency synthesizer and ii) output the second local oscillator signal to the second transceiver block; and a first set of baseband signal interface pins, wherein i) baseband signals used to generate signals transmitted by the first transceiver block are received from the first set of baseband signal interface pins, ii) baseband signals derived from signals received by the second transceiver block are output to the first set of baseband signal interface pins, and iii) baseband signals derived from signals received by the first transceiver block are not output to the first set of baseband signal interface pins.

12. The single chip dual band MIMO transceiver of claim 11, further comprising a third transceiver block adjacent the second transceiver block, wherein the third transceiver block is adapted to i) transmit a fifth transmit signal in the first frequency band and a sixth transmit signal in the second frequency band, and ii) receive a fifth received signal in the first frequency band and a sixth received signal in the second frequency band, and wherein the second transceiver block includes a third signal repeater and a fourth signal repeater, the third signal repeater adapted to i) receive the first local oscillator signal from the first transceiver block and ii) output the first local oscillator signal to the third transceiver block, and the fourth signal repeater adapted to i) receive the second local oscillator signal from the first transceiver block and ii) output the second local oscillator signal to the third transceiver block.

13. The single chip dual band MIMO transceiver of claim 12, further comprising a second set of signal interface pins and a third set of signal interface pins, wherein i) baseband signals used to generate signals transmitted by the second transceiver block are received from the second set of signal interface pins, ii) baseband signals used to generate signals transmitted by the third transceiver block are received from the third set of signal interface pins, iii) baseband signals derived from signals received by the first transceiver block are output to the third set of signal interface pins, and iv) baseband signals derived from signals received by the third transceiver block are output to the second set of signal interface pins.

14. A scalable MIMO transceiver system comprising:
a frequency synthesizer generating a local oscillator signal;
a plurality of transceiver blocks arranged in a row adjacent the frequency synthesizer;
a plurality of local oscillator signal repeaters associated with the plurality of transceiver blocks;
a plurality of interface signal paths to interface signals between the transceiver system and WLAN baseband circuitry;
a plurality of multiplexers to switch transmit signals and receive signals between the plurality of transceiver blocks and the plurality of interface signal paths; and
a signal bus to route signals between the plurality of transceiver blocks and the plurality of multiplexers such that baseband transmit signals bound for a particular transceiver block share an interface signal path with receive signals from a different transceiver block,
wherein the local oscillator signal is provided to a first transceiver block in the plurality of transceiver blocks to i) modulate baseband signals to be transmitted by the first transceiver block with a carrier signal having a frequency based on the local oscillator signal, and ii) demodulate signals received by the first transceiver block in a frequency band determined by the local oscillator signal, and
wherein a first local oscillator signal repeater associated with the first transceiver block is configured to i) receive the local oscillator signal from the frequency synthesizer and ii) forward the local oscillator signal to a second transceiver block in the plurality of transceiver blocks.

15. The scalable MIMO transceiver system of claim 14 wherein the frequency synthesizer is adapted to generate a first local oscillator signal and a second local oscillator signal, and wherein the transceiver blocks in said plurality of transceiver blocks comprise dual band transceiver blocks adapted to transmit and receive signals in a first frequency band determined by the frequency of the first local oscillator signal and a second frequency band determined by the frequency of the second local oscillator signal.

16. The scalable MIMO transceiver system of claim 15, wherein the first frequency band is centered at a frequency between 2.412 and 2.484 GHz, and the second frequency band is centered at a frequency between 5.915 and 5.825 GHz.

17. The scalable MIMO transceiver system of claim 14, wherein i) the plurality of transceiver blocks comprises first, second, and third transceiver blocks, ii) the plurality of multiplexers comprises first, second and third multiplexers, and iii) the plurality of interface signal paths comprises first, second and third interface signal paths to provide a 3×3 MIMO transceiver.

18. The scalable MIMO transceiver system of claim 17,
wherein the first multiplexer switches between i) connecting transmit signals from the first interface signal path to the first transceiver block and ii) connecting receive signals from the second transceiver block to the first interface signal path,
wherein the second multiplexer switches between i) connecting transmit signals from the second interface signal path to the second transceiver block and ii) connecting receive signals from the third transceiver block to the second interface signal path, and
wherein the third multiplexer switches between i) connecting transmit signals from the third interface signal path to the third transceiver block and ii) connecting receive signals from the first transceiver block to the third interface signal path.

19. A method of providing a modular MIMO transceiver, the method comprising:
providing a frequency synthesizer configured to generate a local oscillator signal;
providing a plurality of transceiver blocks, each of the plurality of transceiver blocks including a local oscillator signal repeater;
sequentially arranging the plurality of transceiver blocks in a row adjacent the frequency synthesizer;
providing the local oscillator signal to a first transceiver block immediately adjacent the frequency synthesizer;
repeating the local oscillator signal using a local oscillator signal repeater of the first transceiver block;
providing the repeated local oscillator signal to a second transceiver block immediately adjacent the first transceiver block;
providing a plurality of interface signal paths configured to provide an interface between the modular MIMO transceiver and baseband circuitry;
providing a plurality of multiplexers configured to connect the plurality of transceiver blocks to the plurality of interface signal paths; and routing signals between the plurality of transceiver blocks and the plurality of multiplexers such that baseband signals used to generate signals transmitted by a particular transceiver block are conveyed across the interface via an interface signal path different from an interface signal path on which baseband signals derived from signals received by the particular transceiver block are conveyed across the interface.

20. The method of claim 19, wherein providing a plurality of transceiver blocks comprises providing dual band transceiver blocks adapted to transmit and receive RF signals in two distinct frequency bands.

21. The method of claim 20, wherein a first frequency band of the two distinct frequency bands is centered at a frequency between 2.412 and 2.484 GHz and a second frequency band of the two distinct frequency bands is centered at a frequency between 5.915 and 5.825 GHz.

22. The method of claim 19 wherein providing a plurality of transceiver blocks comprises providing three transceiver blocks to provide a 3×3 modular MIMO transceiver.

23. The method of claim 22 further comprising:
providing three separate interface signal paths to interface the plurality of transceiver blocks with baseband circuitry; and
providing three multiplexers to switch transmit signals and receive signals between the plurality of transceiver blocks and the plurality of interface signal paths.

24. The method of claim 23 further comprising:
routing i) transmit signals from a first multiplexer to a first transceiver block and ii) receive signals from a second transceiver block to the first multiplexer,
routing i) transmit signals from a second multiplexer to the second transceiver block and ii) receive signals from a third transceiver block to the second multiplexer, and
routing i) transmit signals from a third multiplexer to the third transceiver block and ii) receive signals from the first transceiver block to the third multiplexer.

* * * * *